United States Patent Office
2,947,360
Patented Aug. 2, 1960

2,947,360

TREATMENT OF CLAYEY MATERIALS

George G. Bernard, Crystal Lake, Ill., assignor to The Pure Oil Company, Chicago, Ill., a corporation of Ohio No Drawing. Filed Jan. 14, 1958, Ser. No. 708,743

12 Claims. (Cl. 166—9)

This invention relates to treatment of clayey materials and is more particularly concerned with a process for treating underground oil-producing formations to prevent swelling thereof during secondary water-flooding.

It is well known that underground formations containing even small amounts of clay, while not particularly sensitive to brine, swell upon contact with fresh or non-saline water, thereby decreasing the permeability of the formation and seriously interfering with the ability to inject water into the formation. It is also known that certain chemicals have the ability to prevent or mitigate swelling of clay-containing formations upon contact with water. For example, in Patent No. 2,761,843 there is disclosed a number of basic substituted ammonium compounds which have the ability to prevent swelling of clay and aid in the secondary recovery of oil.

I have discovered that coordination compounds of certain metals and alkyl polyamines are more effective in preventing swelling of clay-containing formations when used in place of the basic nitrogen compounds of the aforesaid patent.

It is an object of this invention to provide a method for preventing swelling of clay-containing materials upon contact with water. It is another object of this invention to provide a method for preventing swelling of clayey oil-containing formations upon contact with water. A still further object of the invention is to provide an improved method for secondary recovery of oil from underground producing formations by means of water-flooding. Further objects of the invention will become manifest from the following detailed description of the invention.

The class of compounds that I have found to be effective may broadly be defined as coordination compounds of metals with alkyl polyamines. While a number of metals form such compounds, their chemistry indicates that copper, nickel, platinum, palladium and cobalt are most useful for this purpose. Alkyl polyamines having the general formula, $NH_2CH_2CH_2(NHCH_2CH_2)_mNH_2$, in which $m$ is an integer from 1 to 4, inclusive, are used in forming the compounds. Coordination compounds particularly useful in connection with this invention are the triethylene tetramine salts which, together with their methods of preparation are discussed in J.A.C.S., 70, 2634–38 (1948). The compounds should be soluble in water in the concentration used. Specific examples of coordination compounds which are effective in preventing swelling of clay are:

Dichlorotriethylenetetraminecobalt chloride
Diamine-(triethylenetetramine)-cobalt chloride
Cis-dinitrotriethylenetetraminecobalt chloride
Carbonatotriethylenetetraminecobalt dextro-camphor sulfonate
Oxalatotriethylenetetraminecobalt dextro-camphor sulfonate
Ethylene diamine(triethylene) cobalt chloride
Tetrokis - (ethylenediamine) - triethylenetetraminedicobalt chloride
Tris-(triethylenetetramine-dicobalt chloride; and the corresponding copper, nickel, platinum and palladium salts.

In order to demonstrate the effectiveness of coordination compounds in accordance with my invention in preventing swelling of clay, tests were made on clay-containing synthetic cores.

The cores were made by subjecting a mixture of Lucite powder, sand and clay to elevated temperature and pressure. For the purposes of these tests, mixtures containing about 83% sand, 15% Lucite molding powder and 2% clay were found to be satisfactory. In preparing the cores the mixture is stirred until a homogeneous mass is obtained. Next, a Lucite tube 1⅜" in length having a 1½" O.D. and 1½" I.D. is placed in a 1½" metallurgical mounting cylinder and filled with the clay-sand-Lucite powder mixture. The mold is heated to 120° C. and maintained at a pressure of 2000–4000 p.s.i. for about 15 minutes. After cooling, the mounted core is removed from the apparatus and the two faces are ground flat on a machine lathe. This produces a core mounted in the same manner as cores commonly used in relative permeability determinations.

The procedure for determining permeability was as follows: The air permeability was determined. The core was then evacuated and saturated with the particular solution which was to be used in the experiment. The cores were then weighed and the porosity was determined. The permeability of the cores to different fluids was then determined. Each solution tested contained 100 p.p.m. of formaldehyde to minimize bacterial problems.

The following examples will demonstrate the effectiveness of coordination compounds in preventing swelling of clays. A core prepared as just described was determined to have a permeability of 752 millidarcies to one molar sodium chloride solution. After this determination, distilled water was passed through the core whereupon the permeability decreased to 14 millidarcies. This behavior is typical of cores which contain swelling-type clays.

A second core was determined to have a permeability of 468 millidarcies to one molar sodium chloride solution. Following this determination 250 cc. of a one molar aqueous solution of dichlorotriethylenetetraminecobalt chloride was passed through the core in accordance with my invention. After this treatment the permeability of the core to distilled water was found to be 491 millidarcies thus demonstrating that swelling of the clay had been prevented.

In order to further demonstrate the efficiency of coordination compounds of the type herein disclosed in preventing swelling of clay-containing formations, a number of core tests similar to those just described were made. Compounds were selected for testing which were thought to be effective in preventing swelling of clay formations. In these tests a 1 molar aqueous NaCl solution containing 1% of the compound to be tested was used. The results of the tests are given in the following Table I.

TABLE I

*Chemicals tested as clay antiswellants*

| Trade Name | Chemical Name | Percent of Initial Permeability after— | |
|---|---|---|---|
| | | 500 cc. Sol. | 1,000 cc. Sol. |
| Volan | Tetraethylenepentamine-hydrochloride | 90 | 90 |
| | MethacrylatoChromic Chloride | 92 | 88 |
| Quilon | Stearato Chromic Chloride | 79 | 73 |
| | Guanidine Hydrochloride | 82.5 | 78 |
| | Methylammonium Methylcarbamate | 57 | |
| Separan 2610 | Unknown (Said to be organic polymer) | 17 | |
| None | Tyrosinehydrochloride | 22 (after 300 cc.) | |
| Nalquat G-8-11 | A benzyl-imidazolinium chloride derivative | 4 | |
| Versene | Ethylenediaminetetra-sodiumacetate | 2 (after 300 cc.) | |
| Ethomeen C/15 | Polyoxyethylene substituted fatty amide | 98 | 94 |
| Arquad 12 | Dodecyl-trimethylammonium chloride | 86 | 80 |
| Nalco 600 | Unknown (Said to be organic polymer) | 83 | 68 |
| | Dichlorotriethylenetetraminecobalt chloride | 103 | 105 |
| | Triethylsulfonium Iodide | 100 | 99 |
| Goodrite K720 | Unknown | 41 | |
| Ethomid HT-60 | Product of Armid HT +50 moles of ethylene oxide | 19 (after 300 cc.) | |
| | Perfluorobutyric Acid | 2 (after 300 cc.) | |
| Krillium | Unknown (Said to be methacrylate polymer) | 4 (after 240 cc.) | |

In all these tests cores were used which contained 2% of montmorillonite as the clay material. These cores, when 200 cc. of distilled water were passed through, decreased 90% in permeability. An examination of Table I will show that dichlorotriethylenetetraminecobalt chloride was the only compound that produced an increase in permeability of the formation. Other compounds, including tetraethylenepentamine hydrochloride, Volan, Ethomeen C/15 and triethylsulphonium iodide, were highly effective in preventing clay swelling, but were not as effective as dichlorotriethylenetetramine-cobalt chloride.

Since the effect of swelling of clay is critical only adjacent the injection well, only sufficient solution containing the coordination compound need be injected to treat the formation to be flooded for a radial distance of approximately 1 to 50 ft. from the injection well prior to the water-flooding operation.

Although in the specific example a one molar or one percent solution of the coordination compound was used, it should be understood that the concentration of the aqueous solution of the coordination compound may vary widely, but sufficient solution should be injected to provide enough of the compound to exchange ions with the cations in that portion of the clay to be treated. Although I prefer to use aqueous solutions containing about 1% of NaCl in order to avoid swelling during the treatment, fresh water solutions of the coordination compounds may be used with good results.

It will be seen that I have discovered a class of compounds which can be used to effectively prevent swelling of clay or clay-containing materials and thereby improve the operation of water-flooding oil-containing, underground formations in order to increase the production of oil therefrom.

What is claimed is:

1. The method of preventing swelling of clay-containing material upon contact with non-saline water comprising contacting said material with at least one metal coordination compound of an alkyl polyamine in which the metal component is selected from the group consisting of copper, cobalt, nickel, platinum, and palladium, and thereafter first contacting said material with non-saline water.

2. Method in accordance with claim 1 in which the coordination compound is contacted with said material in the form of an aqueous solution and the amount of said compound contacted with said material is sufficient to exchange ions with the cations in the clay to be treated.

3. Method in accordance with claim 2 in which the alkyl polyamine is selected from the group of compounds corresponding to the formula $$NH_2CH_2CH_2(NHCH_2CH_2)_mNH_2$$

in which $m$ is an integer from 1 to 4 inclusive.

4. Method in accordance with claim 3 in which the compound is a metal coordination compound of triethylene tetramine.

5. Method in accordance with claim 4 in which the metal is cobalt.

6. Method in accordance with claim 5 in which the compound is dichlorotriethylenetetramine cobalt chloride.

7. The method of recovering oil from underground oil-bearing formations containing clay comprising introducing through an injection well at least one metal coordination compound of an alkyl polyamine in which the metal component is selected from the group consisting of copper, cobalt, nickel, platinum, and palladium into contact with the formation adjacent said well prior to contact of said formation with non-saline water and thereafter injecting water through said well into the producing formation.

8. Method in accordance with claim 7 in which the coordination compound is introduced in the form of an aqueous solution in an amount sufficient to exchange ions with the cations in the clay to be treated.

9. Method in accordance with claim 8 in which the alkyl polyamine is selected from the group of compounds corresponding to the formula $$NH_2CH_2CH_2(NHCH_2CH_2)_mNH_2$$

in which $m$ is an integer from 1 to 4 inclusive.

10. Method in accordance with claim 9 in which the compound is a metal coordination compound of triethylene tetramine.

11. Method in accordance with claim 10 in which the metal is cobalt.

12. Method in accordance with claim 11 in which the compound is dichlorotriethylenetetramine cobalt chloride.

References Cited in the file of this patent

UNITED STATES PATENTS

| 2,761,843 | Brown | Sept. 4, 1956 |
| 2,802,784 | Nowak | Aug. 13, 1957 |
| 2,841,222 | Smith | July 1, 1958 |
| 2,848,469 | Kroll et al. | Aug. 19, 1958 |